US012656991B2

(12) United States Patent
Chintapalli

(10) Patent No.: US 12,656,991 B2
(45) Date of Patent: Jun. 16, 2026

(54) SYSTEMS, METHODS, APPARATUSES, AND DEVICES FOR MANAGING A GAZE OF A USER ENGAGED IN A VISUAL COMMUNICATION SESSION WITH AN AUDIENCE

(71) Applicant: Paul Abraham Chintapalli, Plano, TX (US)

(72) Inventor: Paul Abraham Chintapalli, Plano, TX (US)

( * ) Notice: Subject to any disclaimer, the term of this patent is extended or adjusted under 35 U.S.C. 154(b) by 333 days.

(21) Appl. No.: 18/219,108

(22) Filed: Jul. 7, 2023

(65) Prior Publication Data

US 2023/0359423 A1 Nov. 9, 2023

(51) Int. Cl.
| | |
|---|---|
| *G06F 3/14* | (2006.01) |
| *G06F 1/16* | (2006.01) |
| *G06F 3/01* | (2006.01) |
| *G06T 7/70* | (2017.01) |
| *H04N 23/90* | (2023.01) |

(52) U.S. Cl.
CPC .......... *G06F 3/1446* (2013.01); *G06F 1/1607* (2013.01); *G06F 1/165* (2013.01); *G06F 3/013* (2013.01); *G06T 7/70* (2017.01); *H04N 23/90* (2023.01); *G06T 2207/30201* (2013.01)

(58) Field of Classification Search
CPC ...... G06F 3/1446; G06F 1/1607; G06F 1/165; G06F 3/013; G06F 1/1637; G06F 1/1647; G06F 1/1684; G06F 3/0487; G06F 3/1423; G06T 7/70; G06T 2207/30201; H04N 23/90; G09G 2320/0693

USPC ......... 348/14.01, 14.04, 14.02, 14.03, 14.07, 348/14.08
See application file for complete search history.

(56) References Cited

U.S. PATENT DOCUMENTS

| | | | | |
|---|---|---|---|---|
| 8,624,954 B2 * | 1/2014 | Robinson | ................. | H04N 7/15 |
| | | | | 348/14.07 |
| 10,694,145 B1 * | 6/2020 | Skinner | .................... | H04N 7/15 |
| 11,443,560 B1 * | 9/2022 | Wright | ................. | G06V 40/166 |
| 2003/0006942 A1 * | 1/2003 | Searls | .................... | G06F 1/1616 |
| | | | | 345/1.1 |
| 2011/0050542 A1 * | 3/2011 | Lee | ........................ | G06F 3/1431 |
| | | | | 345/1.1 |

(Continued)

*Primary Examiner* — Duc Nguyen
*Assistant Examiner* — Carissa A Jones
(74) *Attorney, Agent, or Firm* — Dhiraj Jindal; PATENT YOGI LLC

(57) ABSTRACT

An apparatus for managing a gaze of a user engaged in a visual communication session with an audience. The apparatus comprises a holder attached to a body of a device used by the user for engaging in the visual communication session with the audience and an auxiliary display device mounted to the body using the holder and communicatively coupled with the device. The device comprises an image capturing device for generating a first content stream and a display screen for displaying a second content stream. The auxiliary display device comprises a communication interface for receiving the second content stream, a processing device for processing the second content stream and generating an auxiliary second content stream based on the processing, and an auxiliary display screen for displaying the auxiliary second content stream. Further, the managing of the gaze is based on viewing the auxiliary second content stream by the user.

20 Claims, 14 Drawing Sheets

(56)     References Cited

U.S. PATENT DOCUMENTS

| | | | | |
|---|---|---|---|---|
| 2014/0184639 A1* | 7/2014 | Guo | ..................... | G06F 3/1431 |
| | | | | 345/629 |
| 2014/0375544 A1* | 12/2014 | Venable | .............. | G02B 27/017 |
| | | | | 345/156 |
| 2019/0087000 A1* | 3/2019 | Ricknäs | .................. | G06F 3/013 |
| 2020/0097169 A1* | 3/2020 | Diaz | .................. | G06F 3/04817 |
| 2021/0405865 A1* | 12/2021 | Faulkner | ............... | H04N 7/147 |
| 2023/0319219 A1* | 10/2023 | Vacura | ................ | H04N 5/2628 |
| | | | | 348/14.08 |
| 2023/0324957 A1* | 10/2023 | Thomas-Brigden | ......................... | |
| | | | | G06F 1/1624 |
| | | | | 361/679.26 |
| 2024/0036604 A1* | 2/2024 | Perelli | .................. | G06F 1/1649 |

* cited by examiner

SYSTEMS, METHODS, APPARATUSES, AND DEVICES FOR MANAGING A GAZE OF A USER ENGAGED IN A VISUAL COMMUNICATION SESSION WITH AN AUDIENCE

FIELD OF THE INVENTION

Generally, the present disclosure relates to the field of data processing. More specifically, the present disclosure relates to systems, methods, apparatuses, and devices for managing a gaze of a user engaged in a visual communication session with an audience.

BACKGROUND OF THE INVENTION

With the increased use of video conferences and video meetings, most often the presenter's (user or individual) focus is not on the virtual audience, but elsewhere because the presenter focuses on someone in the meeting or the presenter is focusing on themselves. This results in a lack of eye contact, which sends a mixed or wrong signal to the interviewer or the audience with whom the presenter is engaged during video conferences and video meetings. The lack of eye contact has a high impact in critical situations such as job interviews, sales presentations, webinars, workplace meetings, teaching, etc.

Existing apparatuses such as holders for webcams (such as PlexiCam™ and Center Cam™) for facilitating visual communication between an individual and an audience are deficient with regard to several aspects. Further, the current apparatuses are just webcam holders to place a new webcam across the laptop/desktop screen. As a result, different apparatuses are needed that modify the gaze of the user and hence allow the user to make eye contact with the audience. Further, the current apparatuses are bulky and do not work fluidly. Further, the current apparatuses have limited use and need dismantling after a video call.

Emerging technologies such as AI technology implemented by Microsoft™/Nvidia™/Casablanca™ for facilitating visual communication between an individual and an audience are deficient with regard to several aspects. Further, emerging technologies are not available for devices operated on Windows or Mac operating systems. Further, emerging technologies don't work on legacy (or old) computers. Further, the emerging technologies require new computers that have greater processing power which makes the emerging technologies expensive. Further, the emerging technologies are developed by global corporations therefore they are dependent on other components such as chips, software, etc. which are also produced by global corporations. Further, the emerging technologies do not fix the unnatural glare of the individual during visual communication with the audience.

Existing devices such as movable wireless webcams (Dell's Concept Pari) that may be movably mounted on a screen of a device (laptop, desktop, etc.) are provided by Dell™ for facilitating visual communication. Further, the existing devices are deficient with regard to several aspects. Further, the existing devices may only be mounted on the screen of the device which is already compatible with the existing devices and may not be mounted to the screen of any other devices. Further, the existing devices are just webcams and do not offer any solution to modify the gaze of a user engaged in visual communication with an audience via the existing devices.

Therefore, there is a need for improved systems, methods, apparatuses, and devices for managing a gaze of a user engaged in a visual communication session with an audience that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for managing a gaze of a user engaged in a visual communication session with an audience, in accordance with some embodiments. Accordingly, the apparatus may include a holder and at least one auxiliary display device. Further, the holder may be configured to be attached to a body of a device used by the user for engaging in the visual communication session with the audience. Further, the at least one auxiliary display device may be configured to be mounted to the body of the device using the holder. Further, the at least one auxiliary display device may be configured to be communicatively coupled with the device. Further, the device may include an image capturing device and a display screen. Further, the display screen displays a second content stream associated with the audience and the image capturing device generates a first content stream comprising the gaze of the user by capturing a plurality of images associated with the user. Further, the user engages in the visual communication session based on the displaying of the second content stream and the generating of the first content stream. Further, the at least one auxiliary display device may include at least one communication interface, a processing device, and at least one auxiliary display screen. Further, the at least one communication interface may be configured for receiving the second content stream from the device. Further, the processing device may be communicatively coupled with the at least one communication interface. Further, the processing device may be configured for processing the second content stream. Further, the processing device may be configured for generating an auxiliary second content stream based on the processing. Further, the at least one auxiliary display screen may be communicatively coupled with the processing device. Further, the at least one auxiliary display screen may be configured for displaying the auxiliary second content stream to the user based on the generating. Further, the managing of the gaze of the user may be based on viewing the auxiliary second content stream by the user.

Further disclosed herein is an apparatus for managing a gaze of a user engaged in a visual communication session with an audience, in accordance with some embodiments. Accordingly, the apparatus may include a holder and at least one auxiliary display device. Further, the holder may be configured to be attached to a body of a device used by the user for engaging in the visual communication session with the audience. Further, the at least one auxiliary display device may be configured to be mounted to the body of the device using the holder. Further, the at least one auxiliary display device may be configured to be communicatively coupled with the device. Further, the device may include an image capturing device and a display screen. Further, the display screen displays a second content stream associated with the audience and the image capturing device generates a first content stream comprising the gaze of the user by capturing a plurality of images associated with the user. Further, the user engages in the visual communication session based on the displaying of the second content stream and the generating of the first content stream. Further, the at least one auxiliary display device may include at least one communication interface, a processing device, and at least one auxiliary display screen. Further, the at least one communication interface may be configured for receiving the second content stream from the device. Further, the processing device may be communicatively coupled with the at least one communication interface. Further, the processing device may be configured for processing the second content stream. Further, the processing device may be configured for determining a performance of a screen extending operation based on the processing of the second content stream. Further, the processing device may be configured for generating an auxiliary second content stream based on the processing and the determining of the performance of the screen extending operation. Further, the processing device may be configured for performing the screen extending operation based on the determining of the performance of the screen extending operation. Further, the display screen ceases to display the second content stream based on the performing of the screen extending operation. Further, the at least one auxiliary display screen may be communicatively coupled with the processing device. Further, the at least one auxiliary display screen may be configured for displaying the auxiliary second content stream to the user based on the generating. Further, the managing of the gaze of the user may be based on viewing the auxiliary second content stream by the user.

Further, disclosed herein is an apparatus for managing a gaze of a user engaged in a visual communication session with an audience, in accordance with some embodiments. Accordingly, the apparatus may include a holder and at least one auxiliary display device. Further, the holder may be configured to be attached to a body of a device used by the user for engaging in the visual communication session with the audience. Further, the at least one auxiliary display device may be configured to be mounted to the body of the device using the holder. Further, the at least one auxiliary display device may be configured to be communicatively coupled with the device. Further, the device may include an image capturing device and a display screen. Further, the display screen displays a second content stream associated with the audience and the image capturing device generates a first content stream comprising the gaze of the user by capturing a plurality of images associated with the user. Further, the user engages in the visual communication session based on the displaying of the second content stream and the generating of the first content stream. Further, the at least one auxiliary display device may include at least one communication interface, a processing device, at least one auxiliary display screen, and at least one auxiliary image capturing device. Further, the at least one communication interface may be configured for receiving the second content stream from the device. Further, the processing device may be communicatively coupled with the at least one communication interface. Further, the processing device may be configured for processing the second content stream. Further, the processing device may be configured for generating an auxiliary second content stream based on the processing. Further, the at least one auxiliary display screen may be communicatively coupled with the processing device. Further, the at least one auxiliary display screen may be configured for displaying the auxiliary second content stream to the user based on the generating. Further, the managing of the gaze of the user may be based on viewing the auxiliary second content stream by the user. Further, the at least one auxiliary image capturing device may be configured for generating an auxiliary first content stream by capturing a plurality of auxiliary images of the user. Further, the at least one auxiliary image capturing device and the at least one auxiliary display screen are present on a front side of the at least one auxiliary display device. Further, the user engages in the visual communication session based on the generating of the auxiliary first content stream.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
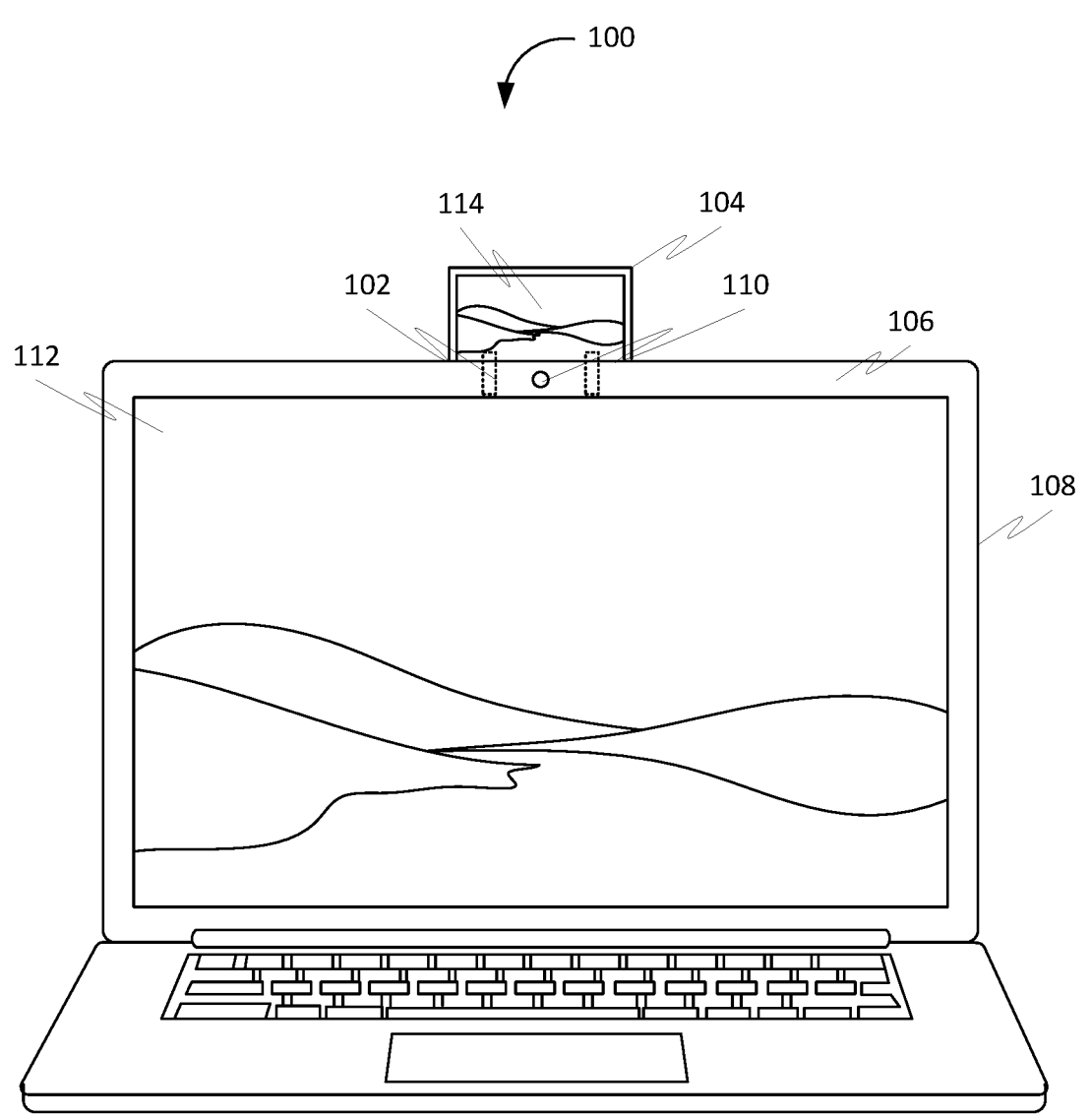
FIG. 1 is a front view of an apparatus 100 for managing a gaze of a user engaged in a visual communication session with an audience, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise.

Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems, methods, apparatuses, and devices for managing a gaze of a user engaged in a visual communication session with an audience, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer and/or the computing device may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer and/or the computing device may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer and/or the computing device may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Overview:

The present disclosure describes systems, methods, apparatuses, and devices for managing a gaze of a user engaged in a visual communication session with an audience.

Further, the present disclosure describes an Eye Contact Aid (EyeKon) for video meetings. Further, the Eye Contact Aid may be a display tool, similar to a teleprompter, that can be placed above or below the webcam of a computer and helps a user to focus on the webcam (camera). Further, the user may look at a small display of the Eye Contact Aid as an object of focus, and by default, the user ends up focusing on the webcam straight. Further, the Eye Contact Aid is an add-on digital display that can be attached to a screen of the computer just above/below the webcam and serves as a mini monitor clone (or an extra screen).

Further, the present disclosure describes projecting the video from the main screen of the computer to a mini display which is the Eye Contact Aid and placed close to the webcam of the computer. Further, the projecting of the video from the main screen to the mini display automatically shifts the user's gaze to the webcam. Further, the projecting is accomplished by cloning or extending the main screen with the mini display. Further, the user's gaze can be fully fixed on the webcam when the video is moved to the mini display through a screen extension. Further, the mini display functions as a teleprompter for fixing the user's gaze. Further, in an embodiment, two mini-displays are placed side by side with the webcam to create a typical teleprompter mode for better and flexible eye focus. Further, the mini display is a USB/HDMI add-on display of 2.5 to 3.5 inches (16:9) with a clip-on mechanism (holder) to the computer's screen, or a standard screw-in option to mount the mini display on a tripod. Upon plug-in, the computer will detect the mini display as an extra monitor and the mini display can be configured as a clone or an extended monitor to display the contents of the video meetings (visual communications). Further, the display resolution of the mini display is 1920× 1080 (FHD).

Further, the user looking at the Eye Contact Aid (ECA), makes the user's eyes look at the webcam of the computer by default and without any distractions. Further, the ECA is a mini-display that displays the video. Further, the ECA is a USB/HDMI plug-in display and can be integrated with an external webcam. Further, the holder may have a flexible design to place the mini display anywhere on the computer.

Further, the present disclosure describes two mini-displays that may be placed on the side of the webcam. Further, the two mini-displays are placed similarly to the teleprompter for flexibility of eye Movement. Further, the two mini-displays may be connected in parallel to function as a single display. Further, the two mini-displays may be connected to connect as independent displays for the teleprompter.

Further, the present disclosure describes EyeKon Plus which is an extension of EyeKon by adding a webcam in the EyeKon. Further, in an embodiment, the webcam may be added on a bezel portion of the EyeKon, which will substitute for a foggy or worn-out webcam (camera) of the computer. Further, in an embodiment, the webcam may be added in the middle of the LCD display of the mini display.

Further, the present disclosure describes a visual aid to establish eye contact during video conference calls using the teleprompter concept.

Further, the visual aid is an EyeKonect which implements the concept of a teleprompter for allowing the user to naturally establish eye contact with the audience. Further, the EyeKonect makes use of the existing webcam on the computer. Further, the EyeKonect serves a dual purpose by serving as a second monitor for other applications associated with the computer.

FIG. 1 is a front view of an apparatus 100 for managing a gaze of a user (such as a user 902) engaged in a visual communication session with an audience, in accordance with some embodiments. Accordingly, the apparatus 100 may include a holder 102 and at least one auxiliary display device 104. Further, the managing of the gaze may allow the user to establish eye contact with the audience for establishing a trusting relationship with the audience, exuding confidence, establishing an executive presence, etc. Further, the user may be a first party of the visual communication session and the audience may be a second party of the visual communication session. Further, the visual communication session may include a video call, a video conferencing, a video meeting, etc. Further, the apparatus 100 may be an Eye Contact Aid (ECA).

Further, the holder 102 may be configured to be attached to a body 106 of a device 108 used by the user for engaging in the visual communication session with the audience. Further, the device 108 enables the visual communication session between the user and the audience. Further, the holder 102 may include a clip-on mechanism for attaching the holder 102 to the body 106. Further, the holder 102 may include a permanent magnet. Further, in an embodiment, the holder 102 may be detachably attached to the body 106. Further, the device 108 may include a computing device such as a laptop, a desktop, etc.

Further, the at least one auxiliary display device 104 may be configured to be mounted to the body 106 of the device 108 using the holder 102. Further, the holder 102 may secure the at least one auxiliary display device 104 to the body 106 for mounting the at least one auxiliary display device 104 to the body 106. Further, the holder 102 attaches to the at least one auxiliary display device 104 for securing the at least one auxiliary display device 104 to the body 106. Further, the at least one auxiliary display device 104 may be configured to be communicatively coupled with the device 108. Further, in an embodiment, the at least one auxiliary display device 104 may be configured to be communicatively coupled with the device 108 using at least one of a wired communication channel and a wireless communication channel. Further, the wired communication channel may include a USB/HDMI cable for communicatively coupling the at least one auxiliary display device 104 with the device 108. Further, the device 108 may include an image capturing device 110 and a display screen 112. Further, the image capturing device 110 may include a camera (such as a webcam). Further, the display screen 112 displays a second content stream associated with the audience and the image capturing device 110 generates a first content stream comprising the gaze of the user by capturing a plurality of images associated with the user. Further, the gaze may include a direction of viewing of the user. Further, the user engages in the visual communication session based on the displaying of the second content stream and the generating of the first content stream. Further, the at least one auxiliary display device 104 may include at least one communication interface 202, a processing device 204, and at least one auxiliary display screen 114. Further, the at least one communication interface 202 may be configured for receiving the second content stream from the device 108. Further, the processing device 204 may be communicatively coupled with the at least one communication interface 202. Further, the at least one communication interface 202 may include a wired communication interface such as a USB interface, a wireless communication interface such as Bluetooth, etc. Further, the processing device 204 may be configured for processing the second content stream. Further, the processing device 204 may be configured for generating an auxiliary second content stream based on the processing. Further, the at least one auxiliary display screen 114 may be communicatively coupled with the processing device 204. Further, the at least one auxiliary display screen 114 may be configured for displaying the auxiliary second content stream to the user based on the generating. Further, the managing of the gaze of the user may be based on viewing the auxiliary second content stream by the user. Further, the first content stream, the second content stream, and the auxiliary second content stream may be media content comprising video content, audio video content, etc. Further, the auxiliary second content stream may be suitable to be displayed on the at least one auxiliary display screen 114.

Further, in some embodiments, the at least one auxiliary display screen 114 may be placed in at least one location in relation to the image capturing device 110 based on the mounting of the at least one auxiliary display device 104. Further, the at least one auxiliary display screen 114 may be spatially proximal to the image capturing device 110 based on the placing of the at least one auxiliary display screen 114 in the at least one location. Further, the at least one location may include a location above the image capturing device 110, a location below the image capturing device 110, a location on a side of the image capturing device 110, etc. Further, the displaying of the auxiliary second content stream may include displaying the auxiliary second content stream from the at least one location.

Figure 5:
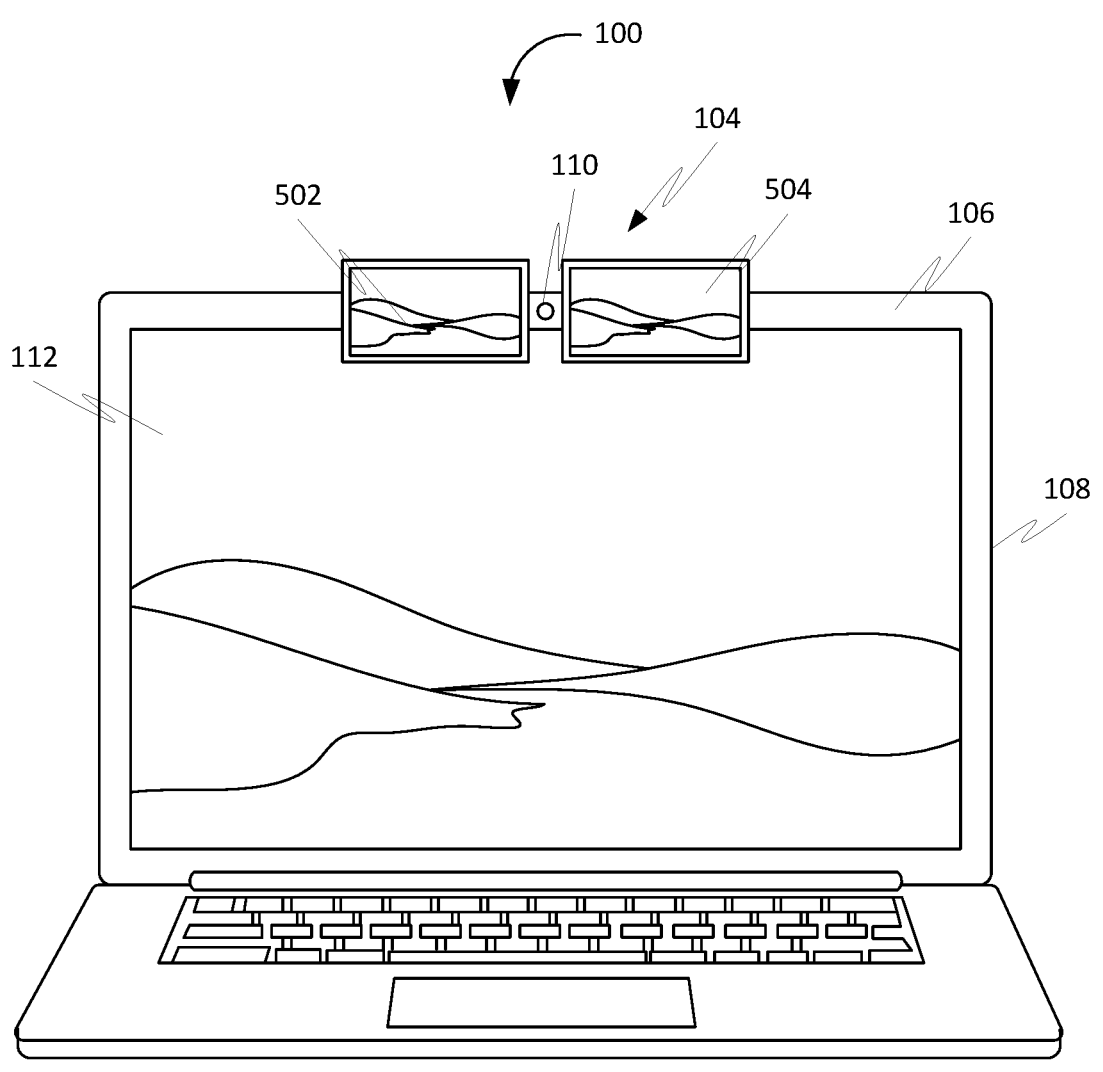
FIG. 5 is a front view of the at least one auxiliary display device 104 with the first auxiliary display screen 502 located on the first side of the image capturing device 110 and the second auxiliary display screen 504 located on the second side of the image capturing device 110, in accordance with some embodiments.

Further, in some embodiments, the at least one auxiliary display screen 114 may include a first auxiliary display screen 502 and a second auxiliary display screen 504, as shown in FIG. 5. Further, the first auxiliary display screen 502 may be placed on a first side of the image capturing device 110 and the second auxiliary display screen 504 may be placed on a second side opposing the first side of the image capturing device 110 based on the mounting of the at least one auxiliary display device 104. Further, the displaying of the auxiliary second content stream may include displaying the auxiliary second content stream from at least one of the first side and the second side of the image capturing device 110. Further, the displaying of the auxiliary second content stream from at least one of the first side and the second side of the image capturing device 110 implements displaying the auxiliary second content stream using a teleprompter. Further, the displaying of the auxiliary second content stream from at least one of the first side and the second side of the image capturing device 110 allows a natural movement of the gaze of the user for maintaining eye contact with the audience. Further, the first auxiliary display screen 502 may display a first portion of the auxiliary second content stream and the second auxiliary display screen 504 may display a second portion of the auxiliary second content stream. Further, the first portion and the second portion make up the auxiliary second content stream.

Further, in an embodiment, the processing device 204 may be configured for determining at least one display mode for the displaying of the auxiliary second content stream by at least one of the first auxiliary display screen 502 and the second auxiliary display screen 504. Further, the at least one display mode may include a simultaneous display mode, an independent display mode, a selective display mode, etc. Further, each of the first auxiliary display screen 502 and the second auxiliary display screen 504 simultaneously displays the auxiliary second content stream in the simultaneous display mode. Further, each of the first auxiliary display screen 502 and the second auxiliary display screen 504 independently display a portion of the auxiliary second content stream in the independent display mode. Further, at least one of the first auxiliary display screen 502 and the second auxiliary display screen 504 display the auxiliary second content stream in the selective display mode. Further, the displaying of the auxiliary second content stream from at least one of the first side and the second side of the image capturing device 110 may be further based on the at least one display mode.

Further, in an embodiment, the processing of the second content stream may include analyzing the second content stream. Further, the determining of the at least one display mode may be based on the analyzing of the second content stream. Further, the analyzing of the second content stream may include analyzing the second content stream for determining at least one characteristic of the audience. Further, the at least one characteristic may include a number of individuals making up the audience, a position of each of the number of the individuals, etc. Further, the determining of the at least one display mode may be based on the at least one characteristic of the audience.

Figure 6:
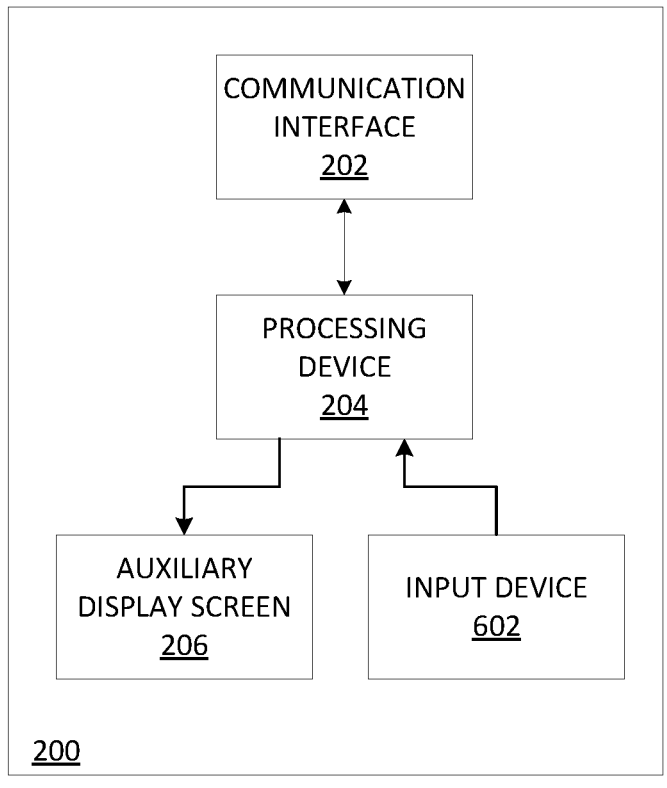
FIG. 6 is a block diagram of the at least one auxiliary display device 104 of the apparatus 100 with the at least one input device 602, in accordance with some embodiments.

Further, in an embodiment, the at least one auxiliary display device 104 may include at least one input device 602, as shown in FIG. 6, communicatively coupled with the processing device 204. Further, the at least one input device 602 may include a button, a dial, a touchscreen, etc. Further, the at least one auxiliary display screen 114 may be a touchscreen. Further, the at least one input device 602 may be configured for receiving at least one input from the user. Further, the at least one input corresponds to an action on the at least one input device 602 by the user corresponding to a display mode of the at least one display mode. Further, the processing device 204 may be further configured for analyzing of the at least one input. Further, the determining of the at least one display mode may be based on the analyzing of the at least one input.

Figure 7:
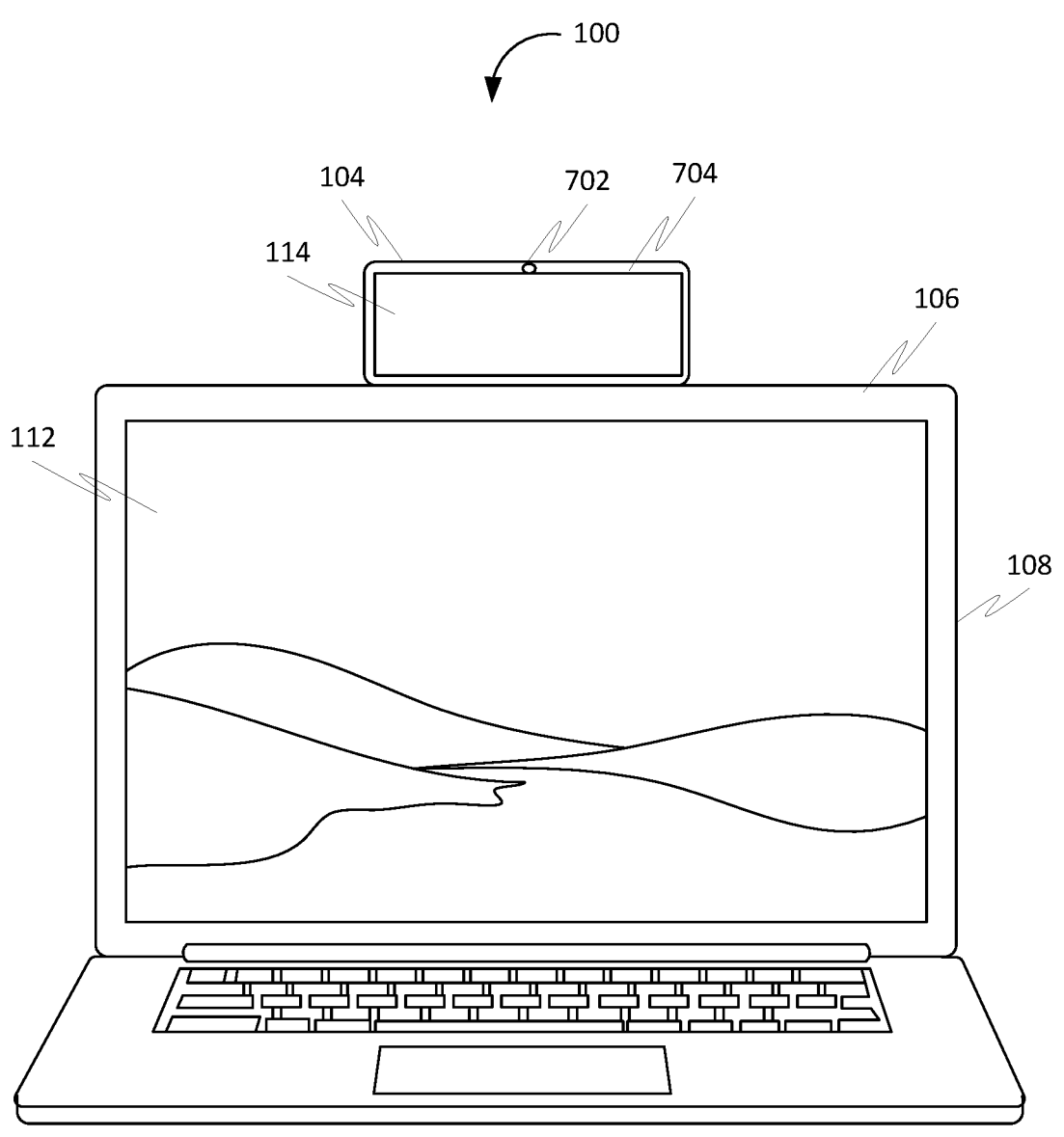
FIG. 7 is a front view of the at least one auxiliary display device 104 with the at least one auxiliary image capturing device 702 present on the peripheral region 704 of the at least one auxiliary display screen 114, in accordance with some embodiments.

Further, in some embodiments, the at least one auxiliary display device 104 further may include at least one auxiliary image capturing device 702, as shown in FIG. 7. Further, the at least one auxiliary image capturing device 702 may include a camera (such as a webcam). Further, the at least one auxiliary image capturing device 702 and the at least one auxiliary display screen 114 may be present on a front side of the at least one auxiliary display device 104. Further, the at least one auxiliary image capturing device 702 may be configured for generating an auxiliary first content stream by capturing a plurality of auxiliary images of the user. Further, the auxiliary first content stream may include the gaze of the user. Further, the user engages in the visual communication session based on the generating of the auxiliary first content stream.

Further, in an embodiment, the at least one auxiliary image capturing device 702 may be present on a peripheral region 704 of the at least one auxiliary display screen 114. Further, the peripheral region 704 may be a bezel region of the at least one auxiliary display screen 114.

Further, in an embodiment, the at least one auxiliary image capturing device 702 may be present on a central region 802 of the at least one auxiliary display screen 114.

Further, in an embodiment, the at least one communication interface 202 may be configured for receiving the first content stream from the image capturing device 110. Further, the processing device 204 may be configured for analyzing the first content stream. Further, the analyzing of the first content stream may include analyzing the first content stream for determining a quality of images captured by the image capturing device 110. Further, the quality corresponds to a fogginess in the images, a blurriness in the images, an oversaturation in the images, etc. Further, the processing device 204 may be configured for determining a state of the image capturing device 110 based on the analyzing of the first content stream. Further, the state corresponds to an inadequacy of the image capturing device 110 to capture the plurality of images. Further, the determining of the state may be based on the quality of the images. Further, the state may include a working state and a worn out state. Further, the generating of the auxiliary first content stream may be based on the state. Further, the auxiliary first content stream may be generated in the worn out state. Further, the auxiliary first content stream may not be generated in the working state. Further, in an embodiment, the at least one auxiliary display device 104 may include the at least one input device 602 communicatively coupled with the processing device 204.

Further, the at least one input device 602 may be configured for receiving at least one first input from the user. Further, the at least one first input corresponds to a selection of the image capturing device 110. Further, the at least one first input corresponds to a selection of the at least one auxiliary image capturing device 702. Further, the generating of the auxiliary first content stream may be based on the at least one first input. Further, the auxiliary first content stream may be generated based on the selection of the at least one auxiliary image capturing device 702. Further, the auxiliary first content stream may not be generated based on the selection of the image capturing device 110.

Further, in some embodiments, the processing device 204 may be configured for determining a performance of a screen extending operation based on the processing of the second content stream. Further, the generating of the auxiliary second content stream may be based on the determining of the performance of the screen extending operation. Further, the processing device 204 may be configured for performing the screen extending operation based on the determining of the performance of the screen extending operation. Further, the display screen 112 ceases to display the second content stream based on the performing of the screen extending operation.

Further, in an embodiment, the at least one communication interface 202 may be configured for receiving the first content stream from the image capturing device 110. Further, the processing device 204 may be configured for analyzing the first content stream. Further, the processing device 204 may be configured for determining an offset in the gaze of the user with respect to a line of view of the image capturing device 110 based on the analyzing of the first content stream. Further, the processing device 204 may be configured for generating at least one calibrating signal for allowing calibrating of a location for the mounting of the at least one auxiliary display device 104 on the body 106 of the device 108 based on the determining of the offset. Further, the at least one auxiliary display screen 114 may be configured for displaying the at least one calibrating signal for facilitating the calibrating of the location for the mounting of the at least one auxiliary display device 104 on the body 106 of the device 108. Further, the at least one calibrating signal may be a signal (such as a visual signal, etc.) to allow adjusting and/or calibrating the location of the at least one auxiliary display device 104 based on the gaze of the user such that the at least one auxiliary display device 104 may be located in an optimal location on the body 106 of the device 108. Further, the user may move the at least one auxiliary display device 104 on the body 106 and view the at least one calibrating signal to find the optimal location. Further, the location may be the optimal location.

Figure 2:
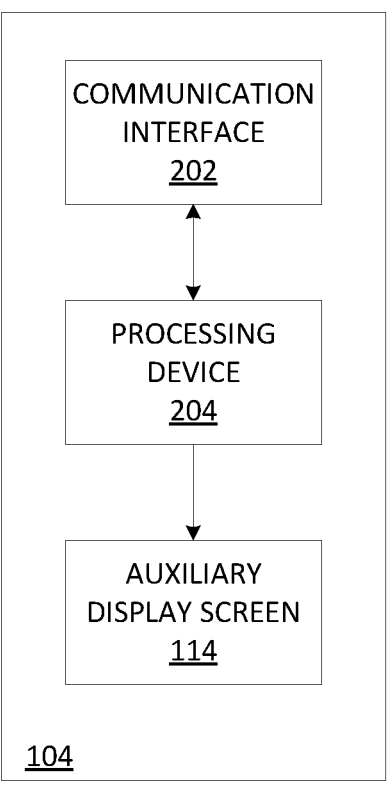
FIG. 2 is a block diagram of the at least one auxiliary display device 104 of the apparatus 100, in accordance with some embodiments.

FIG. 2 is a block diagram of the at least one auxiliary display device 104 of the apparatus 100, in accordance with some embodiments.

Figure 3:
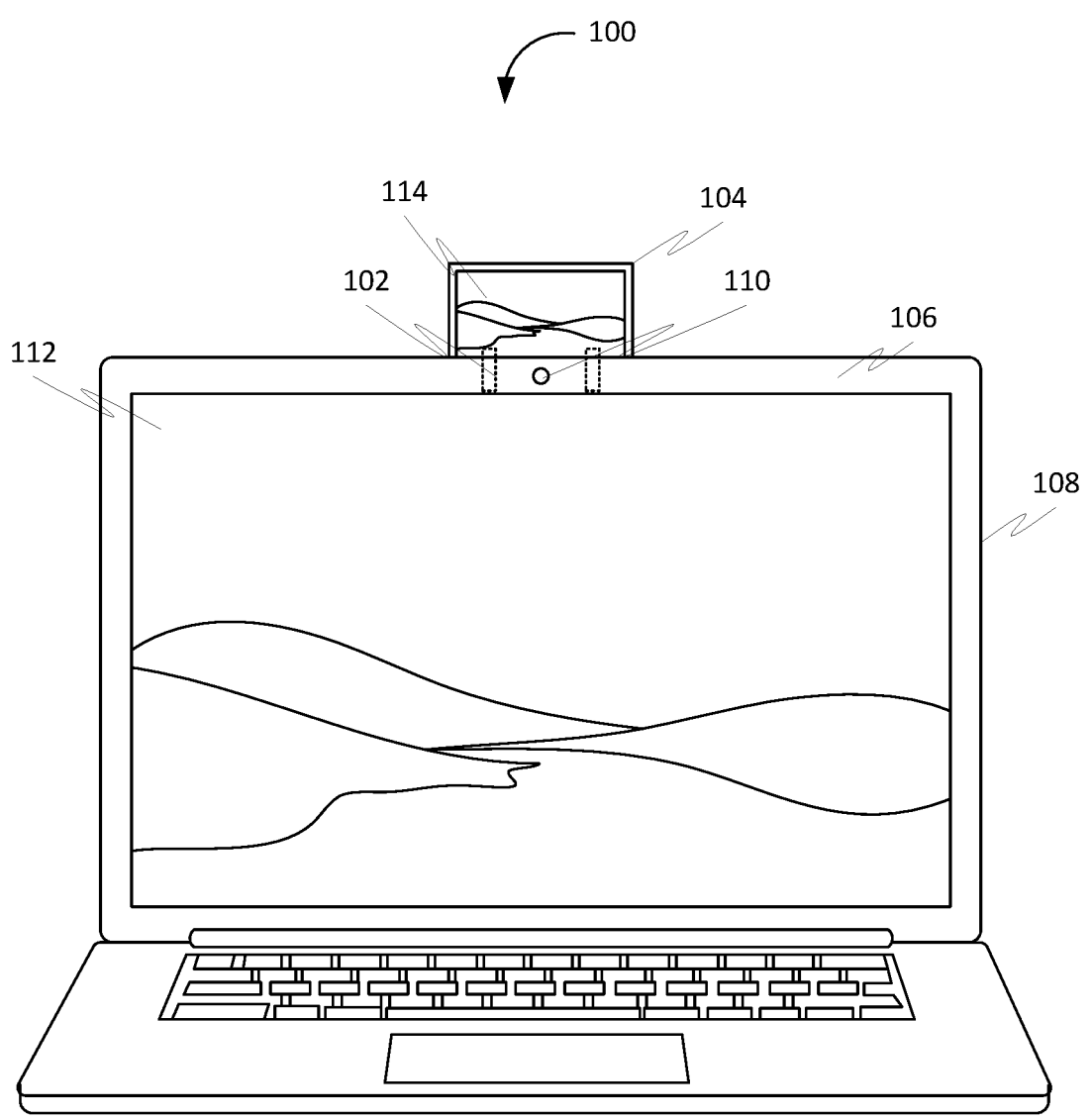
FIG. 3 is a front view of the at least one auxiliary display device 104 with the at least one auxiliary display screen 114 located above the image capturing device 110, in accordance with some embodiments.

FIG. 3 is a front view of the at least one auxiliary display device 104 with the at least one auxiliary display screen 114 located above the image capturing device 110, in accordance with some embodiments.

Figure 4:
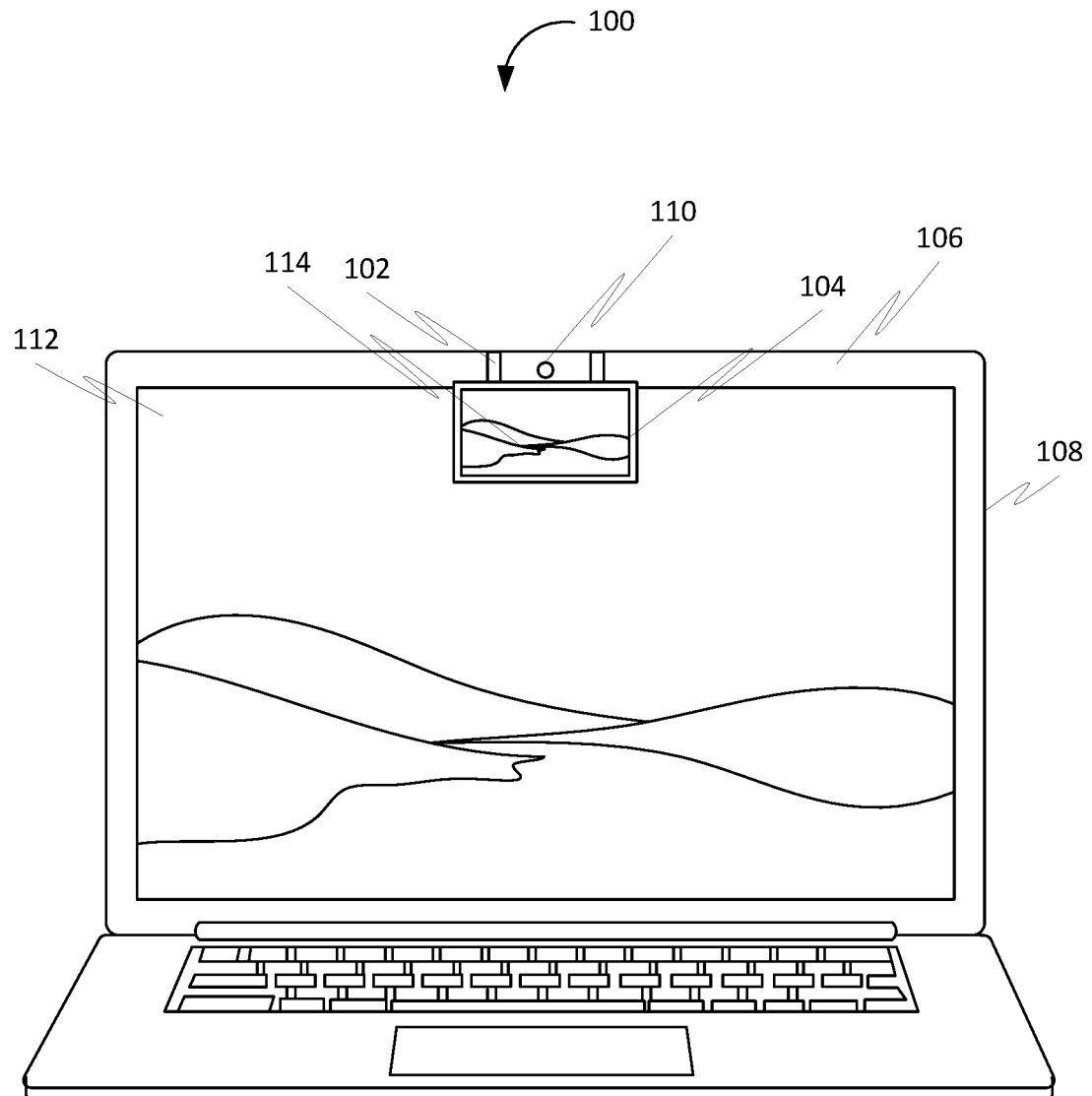
FIG. 4 is a front view of the at least one auxiliary display device 104 with the at least one auxiliary display screen 114 located below the image capturing device 110, in accordance with some embodiments.

FIG. 4 is a front view of the at least one auxiliary display device 104 with the at least one auxiliary display screen 114 located below the image capturing device 110, in accordance with some embodiments.

FIG. 5 is a front view of the at least one auxiliary display device 104 with the first auxiliary display screen 502 located on the first side of the image capturing device 110 and the second auxiliary display screen 504 located on the second side of the image capturing device 110, in accordance with some embodiments.

FIG. 6 is a block diagram of the at least one auxiliary display device 104 of the apparatus 100 with the at least one input device 602, in accordance with some embodiments.

FIG. 7 is a front view of the at least one auxiliary display device 104 with the at least one auxiliary image capturing device 702 present on the peripheral region 704 of the at least one auxiliary display screen 114, in accordance with some embodiments.

Figure 8:
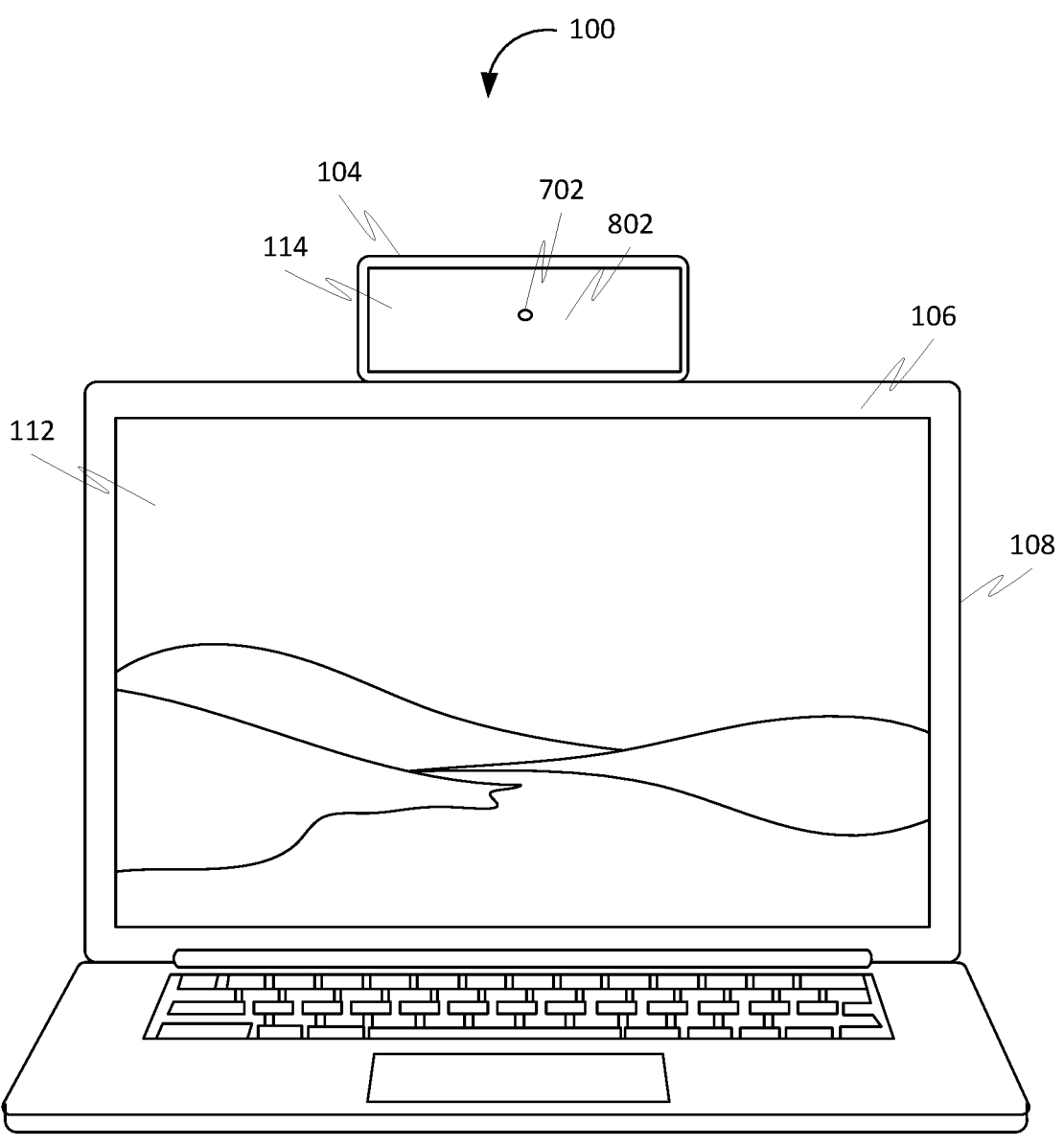
FIG. 8 is a front view of the at least one auxiliary display device 104 with the at least one auxiliary image capturing device 702 present on the central region 802 of the at least one auxiliary display screen 114, in accordance with some embodiments.

FIG. 8 is a front view of the at least one auxiliary display device 104 with the at least one auxiliary image capturing device 702 present on the central region 802 of the at least one auxiliary display screen 114, in accordance with some embodiments.

Figure 9:
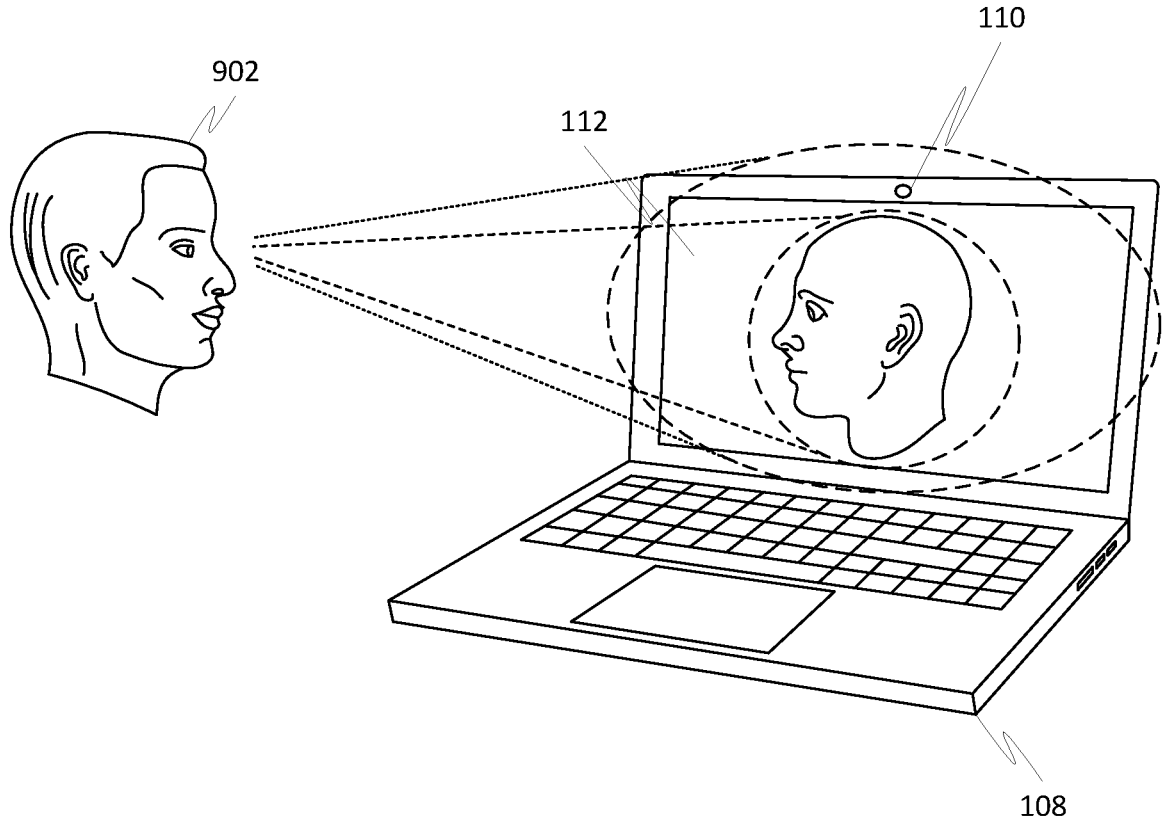
FIG. 9 illustrates the gaze of a user 902 engaging in the visual communication session with the audience using the device 108 without the apparatus 100, in accordance with some embodiments.

FIG. 9 illustrates the gaze of a user 902 engaging in the visual communication session with the audience using the device 108 without the apparatus 100, in accordance with some embodiments. Further, the gaze may be associated with an outer eye cone and an inner eye cone within the outer eye cone. Further, the image capturing device 110 falls in the outer eye cone and at least a portion of the display screen 112 falls within the inner eye cone when the user 902 may be viewing the second content stream on the display screen 112. Further, the gaze of the user 902 may not be directed to the image capturing device 100 when the image capturing device 100 generates the first content stream by capturing the plurality of images of the user 902. Further, the gaze of the user 902 may not be directed toward the image capturing device 100 in the first content stream and thereby there may not be any eye contact established between the user 902 and the audience.

Figure 10:
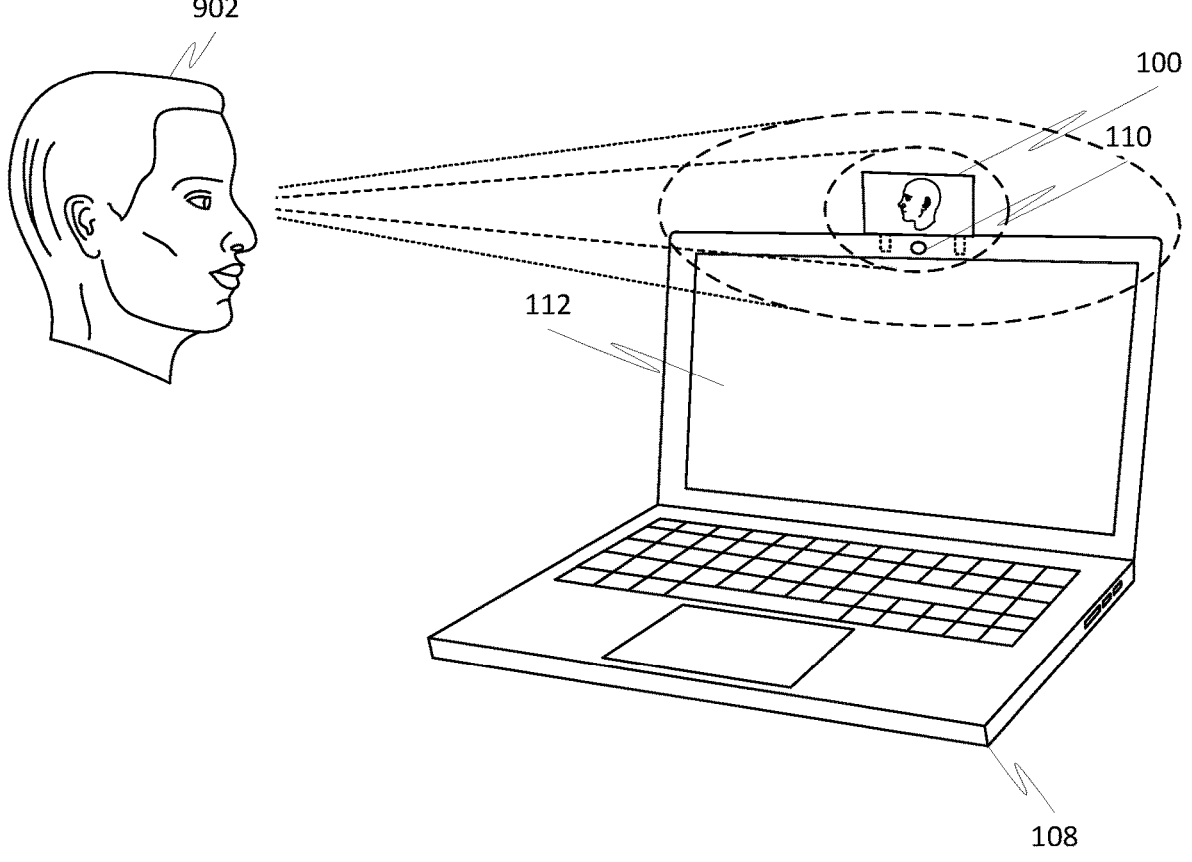
FIG. 10 illustrates the gaze of the user 902 engaging in the visual communication session with the audience using the device 108 with the apparatus 100, in accordance with some embodiments.

FIG. 10 illustrates the gaze of the user 902 engaging in the visual communication session with the audience using the device 108 with the apparatus 100, in accordance with some embodiments. Further, the image capturing device 110 falls in the inner eye when the user 902 may be viewing the auxiliary second content stream on the at least one auxiliary display screen 114 of the at least one auxiliary display device 104 of the apparatus 100. Further, the gaze of the user 902 may be directed to the image capturing device 100 when the image capturing device 100 generates the first content stream by capturing the plurality of images of the user 902. Further, the gaze of the user 902 may be directed toward the image capturing device 100 in the first content stream and thereby there may be eye contact established between the user 902 and the audience. Further, a line of view of the image capturing device 110 falls with the inner eye cone for establishing the eye contact.

Figure 11:
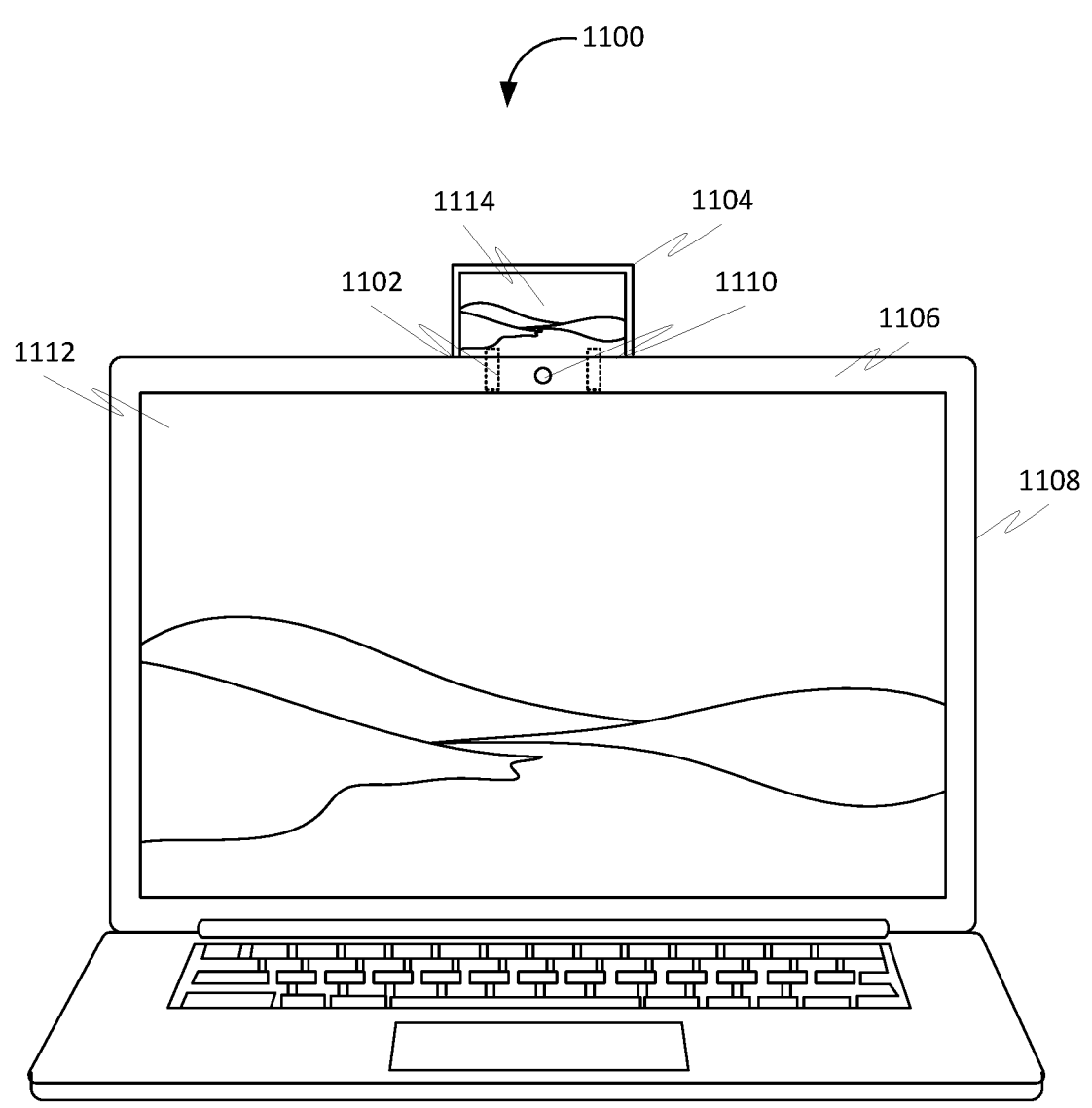
FIG. 11 is a front view of an apparatus 1100 for managing a gaze of a user engaged in a visual communication session with an audience, in accordance with some embodiments.

FIG. 11 is a front view of an apparatus 1100 for managing a gaze of a user engaged in a visual communication session with an audience, in accordance with some embodiments. Accordingly, the apparatus 1100 may include a holder 1102 and at least one auxiliary display device 1104.

Further, the holder 1102 may be configured to be attached to a body 1106 of a device 1108 used by the user for engaging in the visual communication session with the audience.

Further, the at least one auxiliary display device 1104 may be configured to be mounted to the body 1106 of the device 1108 using the holder 1102. Further, the at least one auxiliary display device 1104 may be configured to be communicatively coupled with the device 1108. Further, the device 1108 may include an image capturing device 1110 and a display screen 1112. Further, the display screen 1112 displays a second content stream associated with the audience and the image capturing device 1110 generates a first content stream comprising the gaze of the user by capturing a plurality of images associated with the user. Further, the user engages in the visual communication session based on the displaying of the second content stream and the generating of the first content stream. Further, the at least one auxiliary display device 1104 may include at least one communication interface 1202, a processing device 1204, and at least one auxiliary display screen 1114. Further, the at least one communication interface 1202 may be configured for receiving the second content stream from the device 1108. Further, the processing device 1204 may be communicatively coupled with the at least one communication interface 1202. Further, the processing device 1204 may be configured for processing the second content stream. Further, the processing device 1204 may be configured for determining a performance of a screen extending operation based on the processing of the second content stream. Further, the processing device 1204 may be configured for generating an auxiliary second content stream based on the processing and the determining of the performance of the screen extending operation. Further, the processing device 1204 may be configured for performing the screen extending operation based on the determining of the performance of the screen extending operation. Further, the display screen 1112 ceases to display the second content stream based on the performing of the screen extending operation. Further, the at least one auxiliary display screen 1114 may be communicatively coupled with the processing device 1204. Further, the at least one auxiliary display screen 1114 may be configured for displaying the auxiliary second content stream to the user based on the generating. Further, the managing of the gaze of the user may be based on viewing the auxiliary second content stream by the user.

Further, in some embodiments, the at least one auxiliary display screen 1114 may be placed in at least one location in relation to the image capturing device 1110 based on the mounting of the at least one auxiliary display device 1104. Further, the at least one auxiliary display screen 1114 may be spatially proximal to the image capturing device 1110 based on the placing of the at least one auxiliary display screen 1114 in the at least one location. Further, the displaying of the auxiliary second content stream may include displaying the auxiliary second content stream from the at least one location.

Further, in some embodiments, the at least one auxiliary display screen 1114 may include a first auxiliary display screen and a second auxiliary display screen. Further, the first auxiliary display screen may be placed on a first side of the image capturing device 1110 and the second auxiliary display screen may be placed on a second side opposing the first side of the image capturing device 1110 based on the mounting of the at least one auxiliary display device 1104. Further, the displaying of the auxiliary second content stream may include displaying the auxiliary second content stream from at least one of the first side and the second side of the image capturing device 1110.

Further, in an embodiment, the processing device 1204 may be further configured for determining at least one display mode for the displaying of the auxiliary second content stream by at least one of the first auxiliary display screen and the second auxiliary display screen. Further, the displaying of the auxiliary second content stream from at least one of the first side and the second side of the image capturing device 1110 may be further based on the at least one display mode.

Further, in an embodiment, the processing of the second content stream may include analyzing the second content stream. Further, the determining of the at least one display mode may be further based on the analyzing of the second content stream.

Further, in an embodiment, the at least one auxiliary display device 1104 may include at least one input device communicatively coupled with the processing device 1204. Further, the at least one input device may be configured for receiving at least one input from the user. Further, the processing device 1204 may be further configured for analyzing of the at least one input. Further, the determining of the at least one display mode may be further based on the analyzing of the at least one input.

Further, in some embodiments, the at least one auxiliary display device 1104 further may include at least one auxiliary image capturing device. Further, the at least one auxiliary image capturing device and the at least one auxiliary display screen 1114 may be present on a front side of the at least one auxiliary display device 1104. Further, the at least one auxiliary image capturing device may be configured for generating an auxiliary first content stream by capturing a plurality of auxiliary images of the user. Further, the user engages in the visual communication session based on the generating of the auxiliary first content stream.

Figure 12:
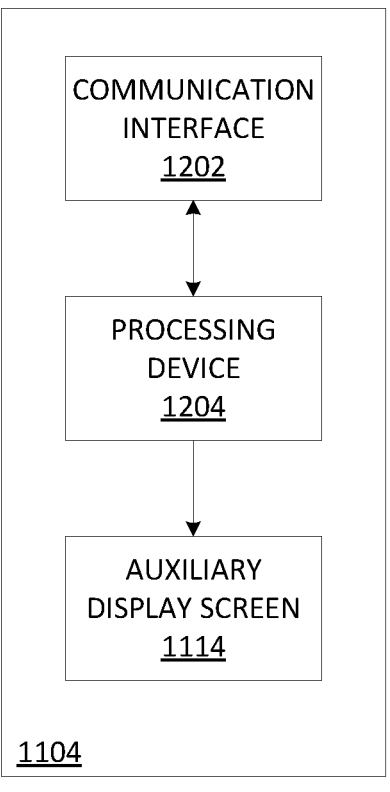
FIG. 12 is a block diagram of the at least one auxiliary display device 1104 of the apparatus 1100, in accordance with some embodiments.

FIG. 12 is a block diagram of the at least one auxiliary display device 1104 of the apparatus 1100, in accordance with some embodiments.

Figure 13:
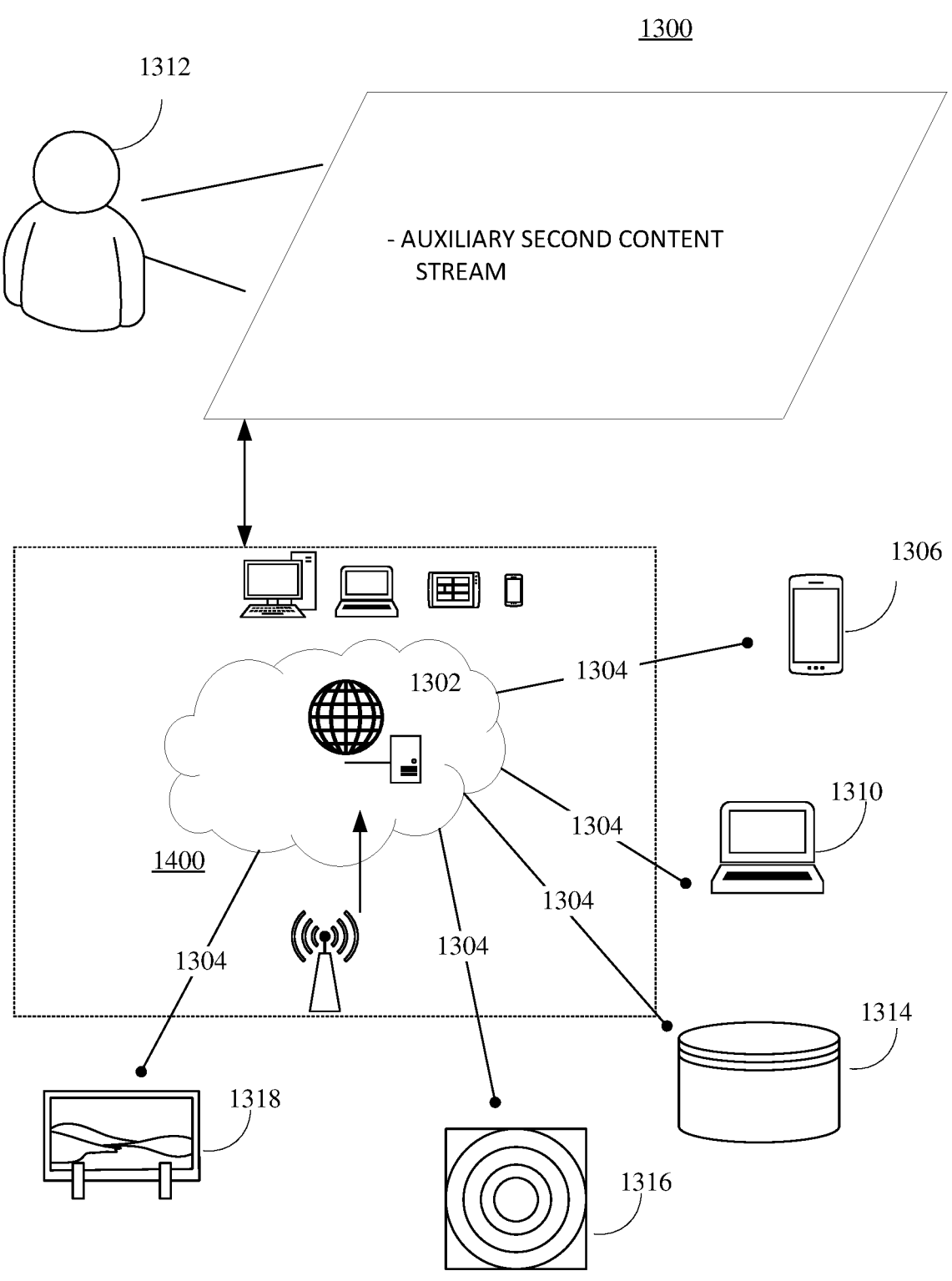
FIG. 13 is an illustration of an online platform consistent with various embodiments of the present disclosure.

FIG. 13 is an illustration of an online platform 1300 consistent with various embodiments of the present disclosure. By way of non-limiting example, the online platform 1300 to facilitate managing a gaze of a user engaged in a visual communication session with an audience may be hosted on a centralized server 1302, such as, for example, a cloud computing service. The centralized server 1302 may communicate with other network entities, such as, for example, a mobile device 1306 (such as a smartphone, a laptop, a tablet computer, etc.), other electronic devices 1310 (such as desktop computers, server computers, etc.), databases 1314, sensors 1316, and an apparatus 1318 (such as the apparatus 100, the apparatus 1100, etc.) over a communication network 1304, such as, but not limited to, the Internet. Further, users of the online platform 1300 may include relevant parties such as, but not limited to, end-users, administrators, service providers, service consumers and so on. Accordingly, in some instances, electronic devices operated by the one or more relevant parties may be in communication with the platform.

A user 1312, such as the one or more relevant parties, may access online platform 1300 through a web based software application or browser. The web based software application may be embodied as, for example, but not be limited to, a website, a web application, a desktop application, and a mobile application compatible with a computing device 1400.

Figure 14:
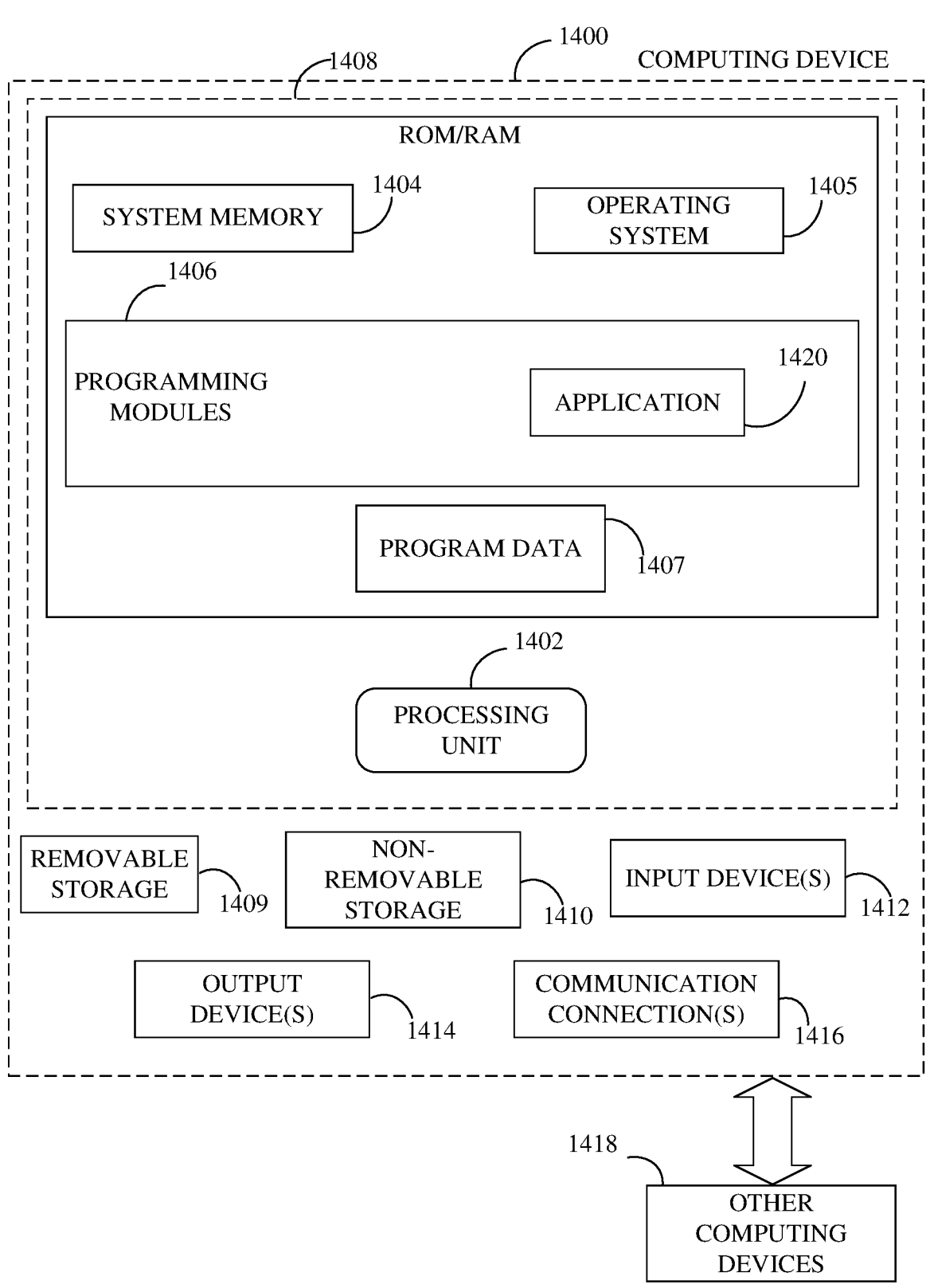
FIG. 14 is a block diagram of a computing device for implementing the methods disclosed herein, in accordance with some embodiments.

With reference to FIG. 14, a system consistent with an embodiment of the disclosure may include a computing device or cloud service, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random-access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include image-processing module, machine learning module. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and non-volatile, removable and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, a location sensor, a camera, a biometric sensor, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1404, including operating system 1405. While executing on processing unit 1402, programming modules 1406 (e.g., application 1420 such as a media player) may perform processes including, for example, one or more stages of methods, algorithms, systems, applications, servers, databases as described above. The aforementioned process is an example, and processing unit 1402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for managing a gaze of a user engaged in a visual communication session with an audience, the apparatus comprising:

a holder configured to be attached to a body of a device used by the user for engaging in the visual communication session with the audience; and at least one auxiliary display device configured to be mounted to the body of the device using the holder, wherein the at least one auxiliary display device is configured to be communicatively coupled with the device, wherein the device comprises an image capturing device and a display screen, wherein the display screen displays a second content stream associated with the audience and the image capturing device generates a first content stream comprising the gaze of the user by capturing a plurality of images associated with the user, wherein the user engages in the visual communication session based on the displaying of the second content stream and the generating of the first content stream, wherein the at least one auxiliary display device comprises:

at least one communication interface configured for receiving the second content stream from the device;

a processing device communicatively coupled with the at least one communication interface, wherein the processing device is configured for:

processing the second content stream; and generating an auxiliary second content stream based on the processing; and at least one auxiliary display screen communicatively coupled with the processing device, wherein the at least one auxiliary display screen is configured for displaying the auxiliary second content stream to the user based on the generating, wherein the second content stream is projected to the at least one auxiliary display device from the device based on the displaying of the auxiliary second content stream, wherein the projecting shifts the gaze of the user to the image capturing device of the device, wherein the managing of the gaze of the user is based on viewing the auxiliary second content stream by the user.

2. The apparatus of claim 1, wherein the at least one auxiliary display screen is placed in at least one location in relation to the image capturing device based on the mounting of the at least one auxiliary display device, wherein the at least one auxiliary display screen is spatially proximal to the image capturing device based on the placing of the at least one auxiliary display screen in the at least one location, wherein the displaying of the auxiliary second content stream comprises displaying the auxiliary second content stream from the at least one location.

3. The apparatus of claim 1, wherein the at least one auxiliary display screen comprises a first auxiliary display screen and a second auxiliary display screen, wherein the first auxiliary display screen is placed on a first side of the image capturing device and the second auxiliary display screen is placed on a second side opposing the first side of the image capturing device based on the mounting of the at least one auxiliary display device, wherein the displaying of the auxiliary second content stream comprises displaying the auxiliary second content stream from at least one of the first side and the second side of the image capturing device.

4. The apparatus of claim 3, wherein the processing device is further configured for determining at least one display mode for the displaying of the auxiliary second content stream by at least one of the first auxiliary display screen and the second auxiliary display screen, wherein the at least one display mode comprises one of a simultaneous display mode, an independent display mode, and a selective display mode, wherein each of the first auxiliary display screen and the second auxiliary display screen simultaneously displays the auxiliary second content stream in the simultaneous display mode, wherein each of the first auxiliary display screen and the second auxiliary display screen independently display a portion of the auxiliary second content stream in the independent display mode, wherein either one of the first auxiliary display screen and the second auxiliary display screen display the auxiliary second content stream in the selective display mode, wherein the displaying of the auxiliary second content stream from at least one of the first side and the second side of the image capturing device is further based on the at least one display mode.

5. The apparatus of claim 4, wherein the processing of the second content stream comprises analyzing the second content stream, wherein the analyzing of the second content stream comprises analyzing the second content stream for determining at least one characteristic of the audience, wherein the at least one characteristic comprises at least one of a number of individuals making up the audience and a position of each of the number of the individuals, wherein the determining of the at least one display mode is further based on the analyzing of the second content stream, wherein the determining of the at least one display mode is further based on the at least one characteristic of the audience.

6. The apparatus of claim 4, wherein the at least one auxiliary display device comprises at least one input device communicatively coupled with the processing device, wherein the at least one input device is configured for receiving at least one input from the user, wherein the processing device is further configured for analyzing of the at least one input, wherein the determining of the at least one display mode is further based on the analyzing of the at least one input.

7. The apparatus of claim 1, wherein the at least one auxiliary display device further comprises at least one auxiliary image capturing device, wherein the at least one auxiliary image capturing device and the at least one auxiliary display screen are present on a front side of the at least one auxiliary display device, wherein the at least one auxiliary image capturing device is configured for generating an auxiliary first content stream by capturing a plurality of auxiliary images of the user, wherein the user engages in the visual communication session based on the generating of the auxiliary first content stream.

8. The apparatus of claim 7, wherein the at least one auxiliary image capturing device is present on a peripheral region of the at least one auxiliary display screen.

9. The apparatus of claim 7, wherein the at least one auxiliary image capturing device is present on a central region of the at least one auxiliary display screen, wherein the at least one auxiliary image capturing device is added in the at least one auxiliary display screen.

10. The apparatus of claim 7, wherein the at least one communication interface is further configured for receiving the first content stream from the image capturing device, wherein the processing device is further configured for:

analyzing the first content stream, wherein the analyzing of the first content stream comprises analyzing the first content stream for determining a quality of images captured by the image capturing device; and determining a state of the image capturing device based on the analyzing of the first content stream, wherein the state corresponds to an inadequacy of the image capturing device to capture the plurality of images, wherein the determining of the state is further based on the quality of the images, wherein the generating of the auxiliary first content stream is further based on the state.

11. The apparatus of claim 7, wherein the at least one auxiliary display device further comprises at least one input device communicatively coupled with the processing device, wherein the at least one input device is configured for receiving at least one first input from the user, wherein the generating of the auxiliary first content stream is further based on the at least one first input, wherein the at least one first input corresponds to one of a selection of the image capturing device and a selection of the at least one auxiliary image capturing device, wherein the auxiliary first content stream is generated based on the selection of the at least one auxiliary image capturing device, wherein the auxiliary first content stream is not generated based on the selection of the image capturing device.

12. The apparatus of claim 1, wherein the processing device is further configured for:

determining a performance of a screen extending operation based on the processing of the second content stream, wherein the generating of the auxiliary second content stream is further based on the determining of the performance of the screen extending operation; and performing the screen extending operation based on the determining of the performance of the screen extending operation, wherein the display screen ceases to display the second content stream based on the performing of the screen extending operation.

13. The apparatus of claim 1, wherein the at least one communication interface is further configured for receiving the first content stream from the image capturing device, wherein the processing device is further configured for:

analyzing the first content stream;

determining an offset in the gaze of the user with respect to a line of view of the image capturing device based on the analyzing of the first content stream; and generating at least one calibrating signal for allowing calibrating of a location for the mounting of the at least one auxiliary display device on the body of the device based on the determining of the offset, wherein the at least one auxiliary display screen is further configured for displaying the at least one calibrating signal for facilitating the calibrating of the location for the mounting of the at least one auxiliary display device on the body of the device, wherein the at least one calibrating signal is a visual signal, wherein the visual signal is viewed by the user and the at least one auxiliary display device is moved by the user on the body to find an optimal location for the at least one auxiliary display device on the body of the device.

14. An apparatus for managing a gaze of a user engaged in a visual communication session with an audience, the apparatus comprising:

a holder configured to be attached to a body of a device used by the user for engaging in the visual communication session with the audience; and at least one auxiliary display device configured to be mounted to the body of the device using the holder, wherein the at least one auxiliary display device is configured to be communicatively coupled with the device, wherein the device comprises an image capturing device and a display screen, wherein the display screen displays a second content stream associated with the audience and the image capturing device generates a first content stream comprising the gaze of the user by capturing a plurality of images associated with the user, wherein the user engages in the visual communication session based on the displaying of the second content stream and the generating of the first content stream, wherein the at least one auxiliary display device comprises:

at least one communication interface configured for receiving the second content stream from the device;

a processing device communicatively coupled with the at least one communication interface, wherein the processing device is configured for:

processing the second content stream;

determining a performance of a screen extending operation based on the processing of the second content stream;

generating an auxiliary second content stream based on the processing of the second content stream and the determining of the performance of the screen extending operation; and performing the screen extending operation based on the determining of the performance of the screen extending operation, wherein the display screen ceases to display the second content stream based on the performing of the screen extending operation; and at least one auxiliary display screen communicatively coupled with the processing device, wherein the at least one auxiliary display screen is configured for displaying the auxiliary second content stream to the user based on the generating, wherein the second content stream is projected to the at least one auxiliary display device from the device based on the displaying of the auxiliary second content stream, wherein the projecting shifts the gaze of the user to the image capturing device of the device, wherein the managing of the gaze of the user is based on viewing the auxiliary second content stream by the user.

15. The apparatus of claim 14, wherein the at least one auxiliary display screen is placed in at least one location in relation to the image capturing device based on the mounting of the at least one auxiliary display device, wherein the at least one auxiliary display screen is spatially proximal to the image capturing device based on the placing of the at least one auxiliary display screen in the at least one location, wherein the displaying of the auxiliary second content stream comprises displaying the auxiliary second content stream from the at least one location.

16. The apparatus of claim 14, wherein the at least one auxiliary display screen comprises a first auxiliary display screen and a second auxiliary display screen, wherein the first auxiliary display screen is placed on a first side of the image capturing device and the second auxiliary display screen is placed on a second side opposing the first side of the image capturing device based on the mounting of the at least one auxiliary display device, wherein the displaying of the auxiliary second content stream comprises displaying the auxiliary second content stream from at least one of the first side and the second side of the image capturing device.

17. The apparatus of claim 16, wherein the processing device is further configured for determining at least one display mode for the displaying of the auxiliary second content stream by at least one of the first auxiliary display screen and the second auxiliary display screen, wherein the at least one display mode comprises one of a simultaneous display mode, an independent display mode, and a selective display mode, wherein each of the first auxiliary display screen and the second auxiliary display screen simultaneously displays the auxiliary second content stream in the simultaneous display mode, wherein each of the first auxiliary display screen and the second auxiliary display screen independently display a portion of the auxiliary second content stream in the independent display mode, wherein either one of the first auxiliary display screen and the second auxiliary display screen display the auxiliary second content stream in the selective display mode, wherein the displaying of the auxiliary second content stream from at least one of the first side and the second side of the image capturing device is further based on the at least one display mode.

18. The apparatus of claim 17, wherein the processing of the second content stream comprises analyzing the second content stream, wherein the analyzing of the second content stream comprises analyzing the second content stream for determining at least one characteristic of the audience, wherein the at least one characteristic comprises at least one of a number of individuals making up the audience and a position of each of the number of the individuals, wherein the determining of the at least one display mode is further based on the analyzing of the second content stream, wherein the determining of the at least one display mode is further based on the at least one characteristic of the audience.

19. The apparatus of claim 18, wherein the at least one auxiliary display device comprises at least one input device communicatively coupled with the processing device, wherein the at least one input device is configured for receiving at least one input from the user, wherein the processing device is further configured for analyzing of the at least one input, wherein the determining of the at least one display mode is further based on the analyzing of the at least one input.

20. An apparatus for managing a gaze of a user engaged in a visual communication session with an audience, the apparatus comprising:

a holder configured to be attached to a body of a device used by the user for engaging in the visual communication session with the audience; and at least one auxiliary display device configured to be mounted to the body of the device using the holder, wherein the at least one auxiliary display device is configured to be communicatively coupled with the device, wherein the device comprises an image capturing device and a display screen, wherein the display screen displays a second content stream associated with the audience and the image capturing device generates a first content stream comprising the gaze of the user by capturing a plurality of images associated with the user, wherein the user engages in the visual communication session based on the displaying of the second content stream and the generating of the first content stream, wherein the at least one auxiliary display device comprises:

at least one communication interface configured for receiving the second content stream from the device;

a processing device communicatively coupled with the at least one communication interface, wherein the processing device is configured for:

processing the second content stream; and generating an auxiliary second content stream based on the processing;

at least one auxiliary display screen communicatively coupled with the processing device, wherein the at least one auxiliary display screen is configured for displaying the auxiliary second content stream to the user based on the generating, wherein the second content stream is projected to the at least one auxiliary display device from the device based on the displaying of the auxiliary second content stream, wherein the projecting shifts the gaze of the user to the image capturing device of the device, wherein the managing of the gaze of the user is based on viewing the auxiliary second content stream by the user; and at least one auxiliary image capturing device configured for generating an auxiliary first content stream by capturing a plurality of auxiliary images of the user, wherein the at least one auxiliary image capturing device and the at least one auxiliary display screen are present on a front side of the at least one auxiliary display device, wherein the user engages in the visual communication session based on the generating of the auxiliary first content stream.

* * * * *